(12) United States Patent
Xiong et al.

(10) Patent No.: US 8,694,239 B2
(45) Date of Patent: Apr. 8, 2014

(54) NAVIGATION SYSTEM WITH INTELLIGENT TRIE AND SEGMENTATION MECHANISM AND METHOD OF OPERATION THEREOF

(75) Inventors: Kun Xiong, Beijing (CN); Jing Hu, Beijing (CN)

(73) Assignee: Telenav, Inc., Sunnyvale, CA (US)

( * ) Notice: Subject to any disclaimer, the term of this patent is extended or adjusted under 35 U.S.C. 154(b) by 48 days.

(21) Appl. No.: 13/324,481

(22) Filed: Dec. 13, 2011

(65) Prior Publication Data

US 2013/0151137 A1 Jun. 13, 2013

(51) Int. Cl.
*G01C 21/00* (2006.01)
(52) U.S. Cl.
USPC ........................................................ 701/400
(58) Field of Classification Search
USPC ............. 701/400, 408–410, 426, 430–1, 438, 701/468
See application file for complete search history.

(56) References Cited

U.S. PATENT DOCUMENTS

| | | | |
|---|---|---|---|
| 2006/0149766 A1 | 7/2006 | Ghoting et al. | |
| 2008/0016066 A1 | 1/2008 | Kuznetsov et al. | |
| 2008/0040384 A1 | 2/2008 | Kuznetsov | |
| 2009/0265093 A1 * | 10/2009 | Kawauchi | 701/200 |

OTHER PUBLICATIONS

Knuth et al., "Fast Pattern Matching in Strings", Jun. 1977, pp. 323-350, vol. 6, No. 2, Publisher: Siam J. Comput, Published in: US.
Wu et al., "A Fast Algorithm for Multi-pattern Searching", May 1994, pp. 1-11.

* cited by examiner

*Primary Examiner* — Yonel Beaulieu
(74) *Attorney, Agent, or Firm* — IP Investment Law Group

(57) ABSTRACT

A method of operation of a navigation system includes: generating a destination index based on a search indicator for distinguishing a candidate destination from another; receiving an entry for a point of interest; generating an entry update based on segmenting the entry for comparing the entry update to the destination index; and identifying a target destination based on resolving the destination index with the search indicator for matching the entry update to the candidate destination for displaying on a device.

20 Claims, 5 Drawing Sheets

NAVIGATION SYSTEM WITH INTELLIGENT TRIE AND SEGMENTATION MECHANISM AND METHOD OF OPERATION THEREOF

TECHNICAL FIELD

The present invention relates generally to a navigation system, and more particularly to a system for search mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without a search mechanism has become a paramount concern for the consumer. The inability decreases the benefit of using the tool.

Thus, a need still remains for a navigation system with search mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a destination index based on a search indicator for distinguishing a candidate destination from another; receiving an entry for a point of interest; generating an entry update based on segmenting the entry for comparing the entry update to the destination index; and identifying a target destination based on resolving the destination index with the search indicator for matching the entry update to the candidate destination for displaying on a device.

The present invention provides a navigation system, including: an index module for generating a destination index based on a search indicator for distinguishing a candidate destination from another; a receiver module, coupled to the index module, for receiving an entry for a point of interest; a result generator module, coupled to the index module, for generating an entry update based on segmenting the entry for comparing the entry update to the destination index; and an identification module, coupled to the index module, for identifying a target destination based on resolving the destination index with the search indicator for matching the entry update to the candidate destination for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
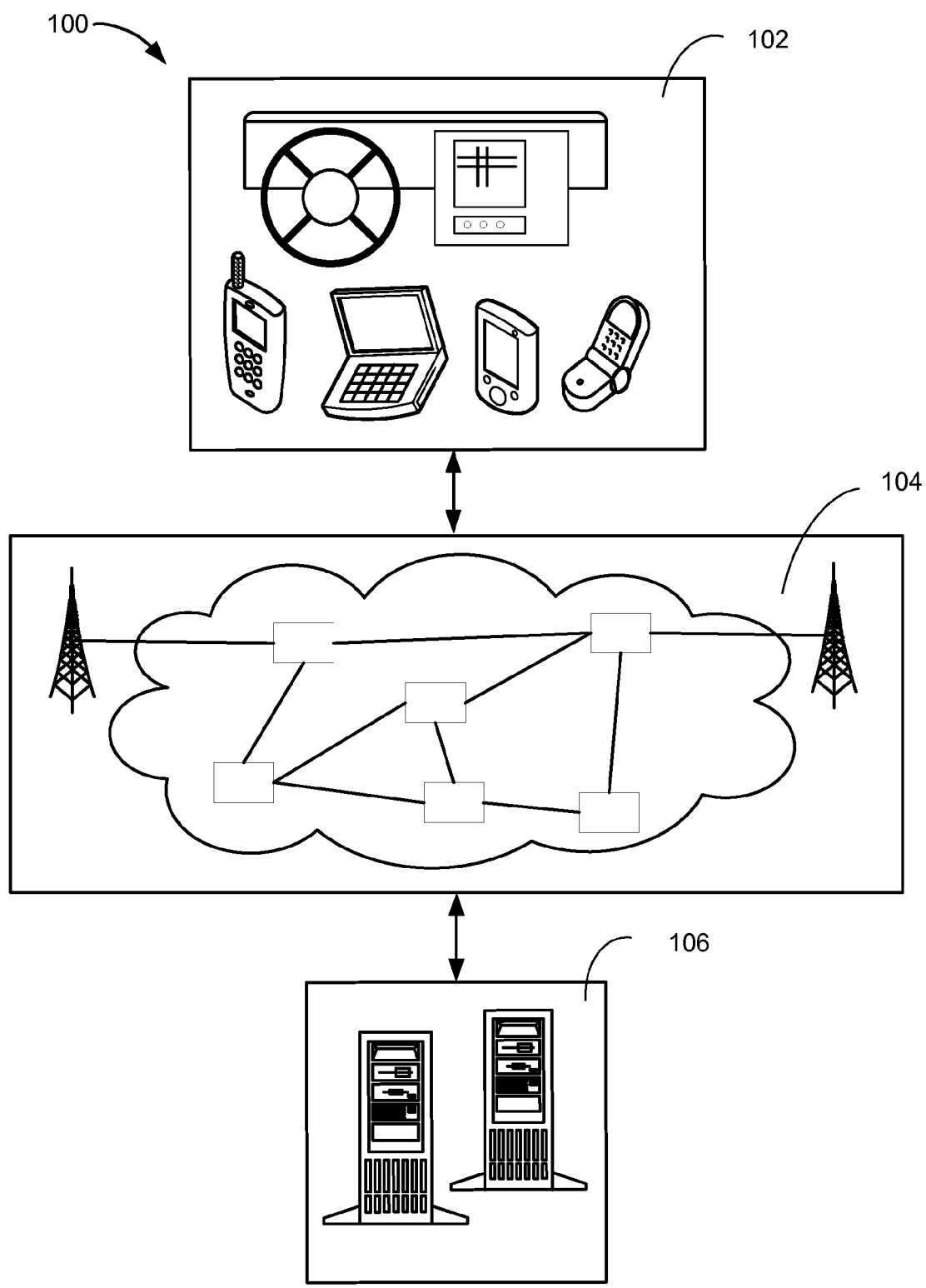
FIG. 1 is a navigation system with intelligent trie and segmentation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with intelligent trie and segmentation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
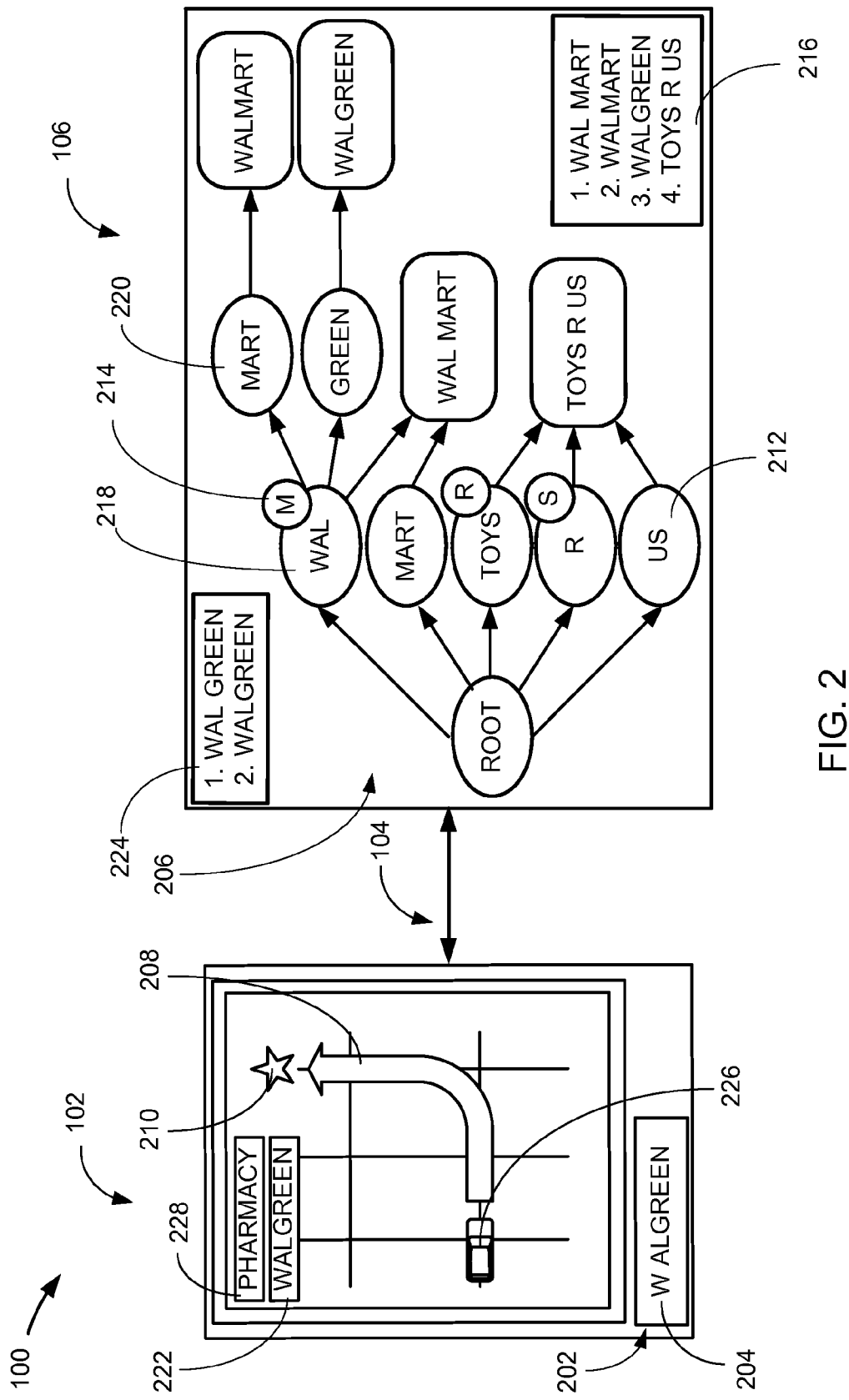
FIG. 2 is an example of comparing an entry for a point of interest to a destination index for generating a route to a target destination.

Referring now to FIG. 2, therein is shown an example of comparing an entry 202 for a point of interest 204 to a destination index 206 for generating a route 208 to a target destination 210. For simplicity going forward, the discussion of the present invention will focus on the first device 102 displaying the result generated by the navigation system 100. However, the second device 106 of FIG. 1 and the first device 102 can be discussed interchangeably.

The entry 202 is defined as an input representing the point of interest 204 received by the first device 102 for determining the target destination 210. The point of interest 204 is defined as a physical location where the user with the first device 102 desires to reach after traveling the route 208. The route 208 is defined as the path taken by the user with the first device 102 for reaching the target destination 210. The target destination 210 is defined as the endpoint after traveling the route 208 that represents the point of interest 204.

The destination index 206 is defined as a trie that represents an ordered tree data structure that incorporates a candidate segment 212 having a search indicator 214 for organizing a candidate destination 216. The trie is defined as an ordered tree data structure. The prefix tree can be synonymous with the trie. The candidate segment 212 is defined as a node of a trie. For example, the candidate segment 212 can represent an array of strings, integers, characters, objects, or a combination thereof.

The search indicator 214 is defined as a pointer recorded on a first candidate segment 218 signifying the start character of a second candidate segment 220. The first candidate segment 218 and the second candidate segment 220 are defined as nodes in the destination index 206. For example, the first candidate segment 218 is followed by the second candidate segment 220 in the destination index 206. For further example, the first candidate segment 218 and the second candidate segment 220 can represent an array of strings, integers, characters, objects, or a combination thereof. For a specific example, the first candidate segment 218 can represent an array of string "wal." The second candidate segment 220 can represent an array of string "mart." The search indicator 214 can represent a character "m."

The candidate destination 216 is defined as the possible target location that the navigation system 100 can compare the entry 202 to the destination index 206 to determine the target destination 210. For example, the destination index 206 can include the candidate destination 216, such as "wal mart," "Walmart™," "Walgreen™," and "Toy R Us™."

For further example, the data structure relationship of the candidate segment 212 within the destination index 206 can form the candidate destination 216. For a specific example, the first candidate segment 218 can represent "wal" and the second candidate segment 220 can represent "green." The formation of the data structure relationship by combining the first candidate segment 218 and the second candidate segment 220 in the destination index 206 can represent the candidate destination 216 of "Walgreen™," an American retail store.

The navigation system 100 can generate an entry update 222 to compare the entry 202 to the destination index 206. The entry update 222 is defined as the entry 202 that has been segmented based on the data structure relationship of the candidate segment 212 in the destination index 206. For example, the entry 202 can represent "w algreen" with a white space between the characters "w" and "a." The destination index 206 can include the first candidate segment 218 representing "wal" and the second candidate segment 220 representing "green." Based on the data structure relationship of the candidate segment 212, the navigation system 100 can generate the entry update 222 that includes "Wal green" and "Walgreen" for comparing with the candidate destination 216. The details regarding the generation of the entry update 222 will be discussed later.

An update result 224 is defined as the possible variations of the entry update 222 after segmenting the entry 202. Following the previous example, the update result 224 can include the entry update 222 representing "Wal green" and "Walgreen."

A geographic location 226 is defined as the physical location factored by the navigation system 100 to limit the comparison between the entry 202 and the destination index 206. For example, the geographic location 226 can represent the current location of the navigation system 100. The entry 202 can represent "wa lgreen," with a white space between the characters "a" and "l." The navigation system 100 can generate the destination index 206 based on the current location to limit the comparison between the entry 202 to the candidate destination 216 near the current location.

A category of interest 228 is defined as the type of physical location factored by the navigation system 100 to limit the comparison between the entry 202 and the destination index 206. For example, the category of interest 228 can represent "pharmacy." The entry 202 can be "targ et," with a white space between the characters "g" and "e." The navigation system 100 can generate the destination index 206 based on the category of interest 228 representing "pharmacy" to limit the comparison between the entry 202 to the candidate destination 216 representing Target™, an American retail store, with a pharmacy.

Figure 3:
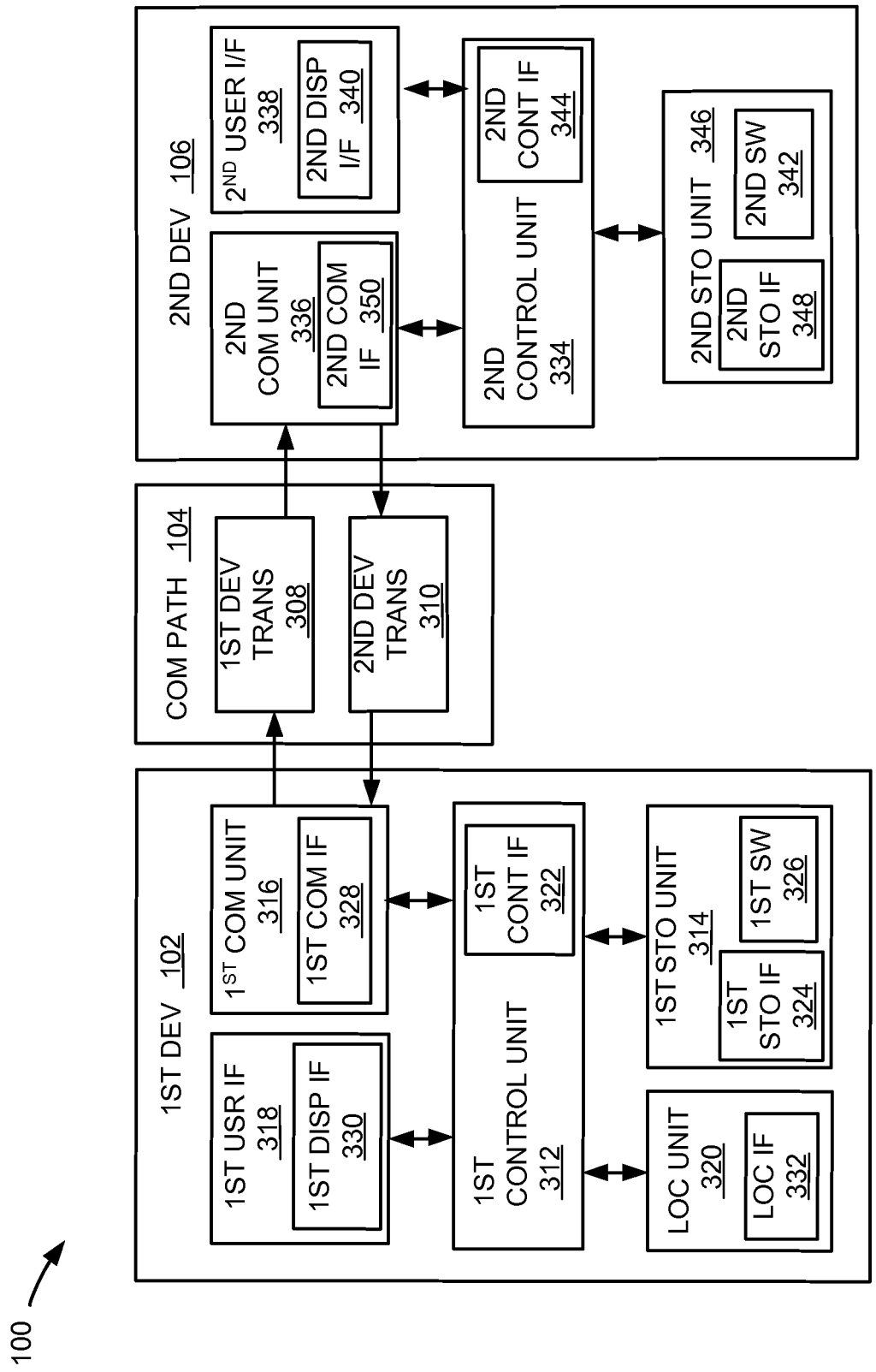
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
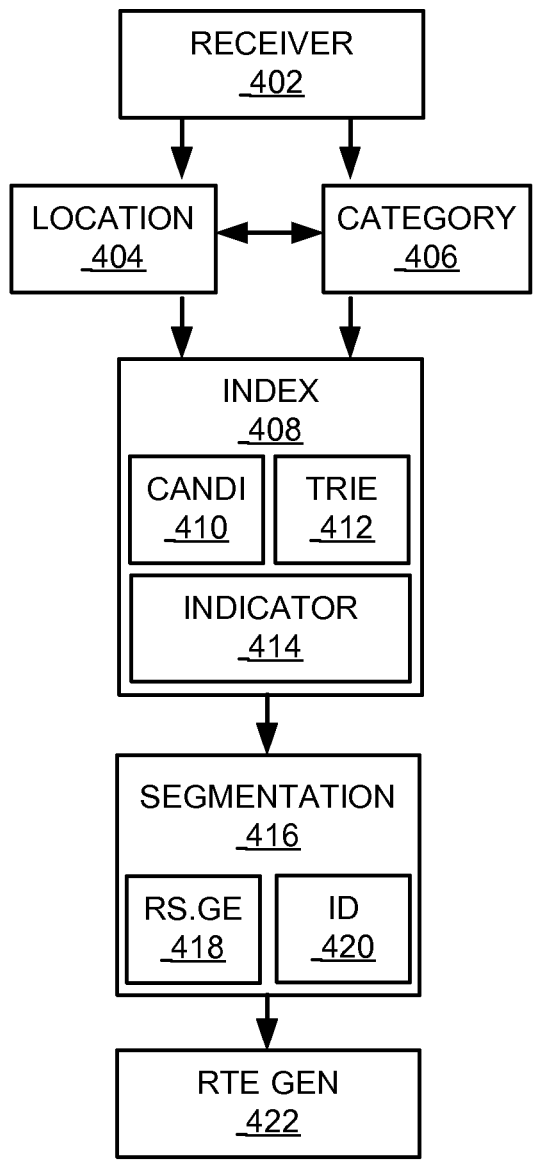
FIG. 4 is a control flow of the navigation system.

Referring now to FIG. 4, therein is shown a control flow of the navigation system 100. The navigation system 100 can include a receiver module 402. The receiver module 402 receives the entry 202 of FIG. 2 for the point of interest 204 of FIG. 2. For example, the receiver module 402 can receive the entry 202 for the point of interest 204.

The receiver module 402 can receive the entry 202 in a number of ways. For a specific example, the entry 202 can be received by an oral command, a selection from a list, or a combination thereof.

For a further example, the entry 202 can include information related to the geographic location 226 of FIG. 2 of the point of interest 204. For a specific example, the entry 202 can include the geographic location 226 representing the current location of the navigation system 100. For another example, the entry 202 can include the geographic location 226 representing a specific city, such as San Francisco, Calif. (CA).

For another example, the entry 202 can include information related to the category of interest 228 of FIG. 2 for the point of interest 204. For a specific example, the entry 202 can include the category of interest 228 representing "Thai restaurant."

The navigation system 100 can include a location module 404, which can be coupled to the receiver module 402. The location module 404 identifies the geographic location 226 for the point of interest 204. For example, the location module 404 can identify the geographic location 226 for limiting the entry update 222 of FIG. 2 compared to the candidate destination 216 of FIG. 2.

The location module 404 can identify the geographic location 226 in a number of ways. For example, if the entry 202 included the geographic location 226 representing the current location of the navigation system 100, the location module 404 can receive the location information for the current location from the location unit 320 of FIG. 3.

For another example, the entry 202 can include the geographic location 226 representing a specific city, such as New York City, N.Y. (NY). The location module 404 can receive the location information for New York City from the location unit 320 of FIG. 3. The location module 404 can limit the comparison of the entry update 222 to the candidate destination 216 by only sending the geographic location 226 that had been identified by the location module 404 to the a trie module 412. For a specific example, the entry update 222 can be limited to compare to the candidate destination 216 in the New York City area. More specifically, the trie module 412 can generate the destination index 206 of FIG. 2 that includes the candidate destination 216 in the New York City area. Details regarding the trie module 412 will be discussed later.

The navigation system 100 can include a category module 406, which can be coupled to the receiver module 402. The category module 406 identifies the category of interest 228 of the point of interest 204. For example, the category module 406 can identify the category of interest 228 for limiting the entry update 222 compared to the candidate destination 216.

The category module 406 can identify the category of interest 228 in a number of ways. For example, the category module 406 can include a database for various types of the category of interest 228. For a specific example, the various types of the category of interest 228 can include "restaurants," "pharmacy," "retail stores," "coffee shops," or a combination thereof.

For example, the entry 202 can include the word "wine." The category module 406 can identify the entry 202 to represent the category of interest 228 for "alcohol," "winery," "liquor store," or a combination thereof.

For another example, the category module 406 can factor the geographic location 226 identified by the location module 404. Continuing from the previous example, the entry 202 can include the word "wine." The geographic location 226 can represent Napa, Calif. The category module 406 can identify and narrow the category of interest 228 to represent "winery" based on the geographic location 226.

The category module 406 can limit the comparison of the entry update 222 to the candidate destination 216 by only sending the category of interest 228 that had been identified by the category module 406 to the trie module 412. For example, the entry update 222 can be limited to compare to the candidate destination 216 that is of the category of interest 228 of "alcohol." More specifically, the trie module 412 can generate the destination index 206 specifically for the candidate destination 216 that belongs to the category of interest 228 of "alcohol." Details regarding the trie module 412 will be discussed later.

The navigation system 100 can include an index module 408, which can be coupled to the location module 404. The index module 408 generates the destination index 206. For example, the index module 408 can generate the destination index 206 based on assigning the search indicator 214 of FIG. 2 for distinguishing the candidate destination 216 from another.

The index module 408 can generate the destination index 206 in a number of ways. For example, the index module 408 can include a database for the candidate destination 216. The database can include the names of various types of the point of interest 204, such as Wal-Mart™, Walgreen™, and Toys R Us™, for the candidate destination 216.

The index module 408 includes a candidate module 410. The candidate module 410 generates the candidate segment 212. For examples, the candidate module 410 can generate the candidate segment 212 of FIG. 2 for segmenting the candidate destination 216.

The candidate module 410 can generate the candidate segment 212 in a number of ways. For example, the candidate module 410 can generate the candidate segment 212 by segmenting the candidate destination 216 represented as an array of strings in the database into each individual characters. For a specific example, the candidate destination 216 representing "Walgreen™" can be segmented into "w," "a," "l," "g," "r," "e," "e," and "n."

For a different example, the candidate module 410 can generate the candidate segment 212 by segmenting the candidate destination 216 into a shorter array of strings. Continuing with the previous example of the candidate destination 216 representing "Walgreen™," the candidate module 410 can segment the candidate destination 216 into "wal" and "green."

The index module 408 includes the trie module 412. The trie module 412 generates the destination index 206 by building the data structure relationship between the more than one of the candidate segment 212. For example, the trie module 412 can generate the destination index 206 based on the geographic location 226 for matching the entry update 222 to the candidate destination 216. For another example, the trie module 412 can generate the destination index 206 based on the category of interest 228 for matching the entry update 222 to the candidate destination 216.

The trie module 412 can generate the destination index 206 in a number of ways. For example, the trie module 412 can generate the destination index 206 by building a prefix tree based on the candidate destination 216 from the database available in the index module 408 discussed above. For a specific example, the trie module 412 can generate the destination index 206 by building a prefix tree based on the candidate segment 212. For a specific example, the destination index 206 can be built by connecting the first candidate segment 218 of FIG. 2 and second candidate segment 220 of FIG. 2. If the candidate destination 216 representing "Walgreen™" was segmented into "wal" as the first candidate segment 218 and "green" as the second candidate segment 220, the trie module 412 can build the destination index 206 by connecting the first candidate segment 218 and the second candidate segment 220.

For another example, the trie module 412 can generate the destination index 206 based on the geographic location 226, the category of interest 228, or a combination thereof for matching the entry update 222 to the candidate destination 216. For a specific example, the database can include the candidate destination 216 for restaurants, retail stores, and coffee shops. If the geographic location 226 can represent New York City, N.Y., the trie module 412 can build the destination index 206 with many types of the candidate destination 216 within New York City. In contrast, the if the geographic location 226 can represent Omaha, Nebr., the trie module 412 can build the destination index 206 that is smaller than the destination index 206 for New York City, as the number of the candidate destination 216 in Omaha can be less than New York City.

For different example, the trie module 412 can refine the destination index 206 based on the category of interest 228. For a specific example, if the category of interest 228 can represent an automobile dealer, the trie module 412 can generate the destination index 206 focused on the candidate destination 216 with the category of interest 228 representing an automobile dealer.

It has been discovered that the present invention provides the navigation system 100 with the ability to reduce the candidate destination 216 considered by generating the destination index 206 based on the geographic location 226, the category of interest 228, or a combination thereof By factoring the geographic location 226, the category of interest 228, or a combination thereof, the navigation system 100 can limit the number of the candidate destination 216 that the entry 202 can be compared to. The limitation alleviates the amount of resources consumed by the navigation system 100 for comparing the entry 202 to the candidate destination 216. Furthermore, the refinement introduces more accurate sample of comparison between the entry 202 and the candidate destination 216. As a result, the refinement leads to efficiency improvement and safer operation of the navigation system 100.

The index module 408 includes an indicator module 414. The indicator module 414 generates the search indicator 214. For example, the indicator module 414 can generate the search indicator 214 for assigning the search indicator 214 to the candidate segment 212.

The indicator module 414 can generate the search indicator 214 in a number of ways. For example, as illustrated in FIG. 2 above, the first candidate segment 218 of FIG. 2 can represent "wal" and the second candidate segment 220 can represent "mart." The indicator module 414 can identify the first character of the second candidate segment 220 to be "m." The indicator module 414 can assign the first character "m" to the first candidate segment 218 as a pointer to the second candidate segment 220. By assigning the search indicator 214 of "m," the indicator module 414 can distinguish the candidate destination 216 having the candidate segment 212 with the search indicator 214 from the candidate destination 216 without the search indicator 214 assigned to the candidate segment 212.

For another example, the search indicator 214 can represent the value within the first position of the array for the candidate segment 212. The indicator module 414 can assign the value within the first position of the array for the candidate segment 212 as the search indicator 214. More specifically, each of the candidate segment 212 having a child node subsequently can have the search indicator 214 assigned as a pointer to the subsequent node of the candidate segment 212.

It has been discovered that the present invention provides the navigation system 100 with the ability to reduce the resource allocation of the navigation system 100 for comparing the entry 202 to the destination index 206. By assigning the search indicator 214 to the candidate segment 212, the navigation system 100 can exclude the candidate segment 212 without the correct value for the search indicator 214. Consequently, the navigation system 100 can avoid traversing along the destination index 206 without the search indicator 214 and irrelevant to the entry 202. As a result, the reduction leads to efficiency improvement and safer operation of the navigation system 100.

The navigation system 100 can include a segmentation module 416, which can be coupled to the index module 408. The segmentation module 416 generates the entry update 222. For example, the segmentation module 416 can generate the entry update 222 based on segmenting the entry 202 for comparing the entry update 222 to the destination index 206.

The segmentation module 416 can be shown in pseudo code format as the following pseudo code 1:

```
SEGMENT_FSC(input, seg_pos_list, fsc) {
    For 0 <- i to length(input)-1
        ChildIndex <- root.findChild(input[i], fsc)
        If ChildIndex > 0
            then root <- root.getChild(ChildIndex)
                seg_pos_list.add(i)
                    if i == length(input)-1
                        then all_seg_list.add(seg_pos_list)
                    else
                        then SEGMENT_FSC(input[i+1,end],
            seg_pos_list, root.getFSC( ))
        else
            then break
}
```

TABLE 1 maps between the pseudo code and the specific elements:

| Pseudo Code Parameters | Specification Elements |
|---|---|
| input | the entry 202 |
| ChildIndex | the position of the candidate segment 212 in the destination index 206 |
| fsc | the search indicator 214 |
| all_seg_list | the update result 224 of FIG. 2 |

The segmentation module 416 can generate the entry update 222 in a number of ways. The segmentation module 416 includes a result generator module 418. For example, the result generator module 418 can correct the entry 202 for comparing the entry 202 to the destination index 206. For a specific example, the result generator module 418 can pack the entry 202 to eliminate white spaces. For example, the entry 202 can represent "wal green" with a white space between the characters "l" and "g." The result generator module 418 can pack "wal green" by eliminating the white space to generate "walgreen."

The result generator module 418 can execute the function "SEGMENT_FSC( )" for segmenting the entry 202 that has been packed. More specifically, the result generator module 418 can segment the entry 202 for grouping the entry update 222.

The function "SEGMENT_FSC( )" can segment the entry 202 for generating the entry update 222. For example, the function "SEGMENT_FSC( )" can include the following input values: "input," "seg_pos_list," and "fsc," For a further example, the "input" can represent the entry 202. The "seg_pos_list" is defined as an integer list of the position of the white space for correcting the entry 202 to generate the entry update 222. The "seg_pos_list" can be initialized to be an empty integer list. The "fsc" can represent the search indicator 214.

The for loop "For 0←i to length(input)-1" can be executed until the length of the array for the entry 202 is traversed. The function "ChildIndex←root.findChild(input[i], fsc)" can identify the position of the candidate segment 212 in the destination index 206. For example, the function "findChild( )" can find the candidate segment 212 if the "input[i]" can match the candidate segment 212.

For a specific example, "input" can represent "walgreen." The "input[0]" can represent the character "w." The destination index 206 can include the candidate segment 212 "wal." The function "findChild( )" can find the candidate segment 212 "wal," because the "input[0]" can match with the "w" of the candidate segment 212 representing "walgreen." Subsequently, if the candidate segment 212 "wal" is the first child node after the root node of the prefix tree, the function "findChild" can return the value of "1" for the "ChildIndex" to indicate that the candidate segment 212 found is in the first position of the destination index 206.

The condition "If ChildIndex>0" can continue to be established so long as the function "findChild( )" can find a match between the "input[i]" and the candidate segment 212. The function "root.getChild(ChildIndex)" can extract the candidate segment 212 with the position "ChildIndex" in the destination index 206. For example, if the candidate segment 212 is "wal," the function "getChild( )" can extract the value "wal" from the first position of the destination index 206. Furthermore, the function "root←root.getChild(ChildIndex)" can move the root node of the destination index 206 to the position of the candidate segment 212 or the "ChildIndex" to continue traverse along the destination index 206.

The function "seg_pos_list.add(i)" can add a white space to indicate the separation between the child nodes or the candidate segment 212. For example, as illustrated in FIG. 2, the first candidate segment 218 can represent "wal." The second candidate segment 220 can represent "green." The entry 202 was "walgreen." The function "seg_pos_list.add(i)" can add a white space in "walgreen" between "wal" and "green," because the data structure relationship in the destination index 206 between the first candidate segment 218 and the second candidate segment 220 is separated between "wal" and "green." Furthermore, the function "seg_pos_list.add(i)" can add a white space after "n," because there is no more of the candidate segment 212 after "green." By adding white spaces to the entry 202 that has been packed, the result generator module 418 can generate the entry update 222 that reflects the data structure relationship of the destination index 206. As a result, the entry 202 that had been misspelled can be corrected to match the candidate destination 216 that is available in the destination index 206.

The condition "if i==length(input)-1" determines whether the function "SEGMENT_FSC( )" completed traversing the entire length of the array of the entry 202. If the condition is "yes," the function "all_sel_list.add(seg_pos_list)" can be invoked. For example, the result generator module 418 can generate the update result 224 for comparing the entry update 222 to the candidate destination 216.

The array "all_seg_list" is defined as the result list of all possible segmentation of the entry 202. Continuing with the example, after executing the function "SEGMENT_FSC( )," the "seg_pos_list" for "walgreen" can include the white space position of {8} and {3,8}. The array "all_seg_list" can include the list representing the white space position of {8} and {3,8}.

The white space position {8} and {3,8} can represent all possible segmentation of the entry 202 "walgreen" with the destination index 206 generated by the index module 408. Based on the "seg_pos_list," the result generator module 418 can generate the update result 224 that includes the entry update 222 representing "wal green" and "walgreen."

If the condition is "no," the function SEGMENT_FSC( ) can be called recursively. If the function SEGMENT_FSC( ) is called recursively, the function enters new input values, such as "input[i+1, end]" and "root.getFSC( )" The "input[i+1, end]" represents the traversal to the next position of the array for "input" or the entry 202.

The function "root.getFSC( )" extracts the search indicator 214 from the subsequent node of the candidate segment 212. For example, the function "root.getFSC( )" can extract the first character of the second candidate segment 220.

It has been discovered that the present invention provides the navigation system 100 with the ability to correct the entry 202 that had been misspelled for comparing the entry 202 to the candidate destination 216. By generating the entry update 222, the misspelling of the entry 202 can be corrected. Thereafter, the navigation system 100 can improve the accuracy to match the entry 202 to the candidate destination 216. Furthermore, the improvement of the accuracy reduces the number of results that may be irrelevant to the point of interest 204. As a result, the correction and improvement leads to productivity increase and safer operation of the navigation system 100.

The segmentation module 416 includes an identification module 420. The identification module 420 identifies the target destination 210 of FIG. 2. For example, the identification module 420 can identify the target destination 210 based on resolving the destination index 206 with the search indicator 214 for matching the entry update 222 to the candidate destination 216 for displaying on the first device 102.

The identification module 420 can identify the target destination 210 in a number of ways. For example, the executing the SEGMENT_FSC( ) with the search indicator 214 can narrow the number of the candidate destination 216. If the array "all_seg_list" includes one variation of segmentation, that one variation of the candidate destination 216 can be identified as the target destination 210.

For another example, the identification module 420 can match the entry update 222 to the candidate destination 216 based on the geographic location 226 for limiting the candidate destination 216 compared. Continuing from the previous example, the update result 224 can include the entry update 222 representing "wal green" and "walgreen." The geographic location 226 can represent San Francisco, Calif. San Francisco has "Walgreen™" but not "Wal green." The identification module 420 can eliminate the entry update 222 for "wal green" and identify "walgreen" as the target destination 210 representing "Walgreen™."

For different example, the identification module 420 can match the entry update 222 to the candidate destination 216 based on the category of interest 228 for limiting the candidate destination 216 compared. Continuing from the previous example, the update result 224 can include the entry update 222 representing "toys r us," "toysr us," and "toysrus." The geographic location 226 can represent Los Angeles, Calif. Los Angeles has "Toys R Us™" but not "Toysrus" or "Toysr Us." The identification module 420 can eliminate the entry update 222 for "Toysrus" and "Toysr Us" and identify "toys r us" as the target destination 210 representing "Toys R Us™."

The navigation system 100 can include a route generator module 422, which can be coupled to the segmentation module 416. The route generator module 422 generates the route 208 of FIG. 2. For example, the route generator module 422 can generate the route 208 to the target destination 210 for displaying on the first device 102.

The physical transformation from generating the route 208 result in the movement in the physical world, such as people using the first device 102, the vehicle, or a combination thereof, and changes in the candidate destination 216 considered for the generation of the destination index 206 based on the operation of the navigation system 100. As the movement in the physical world occurs, the movement itself creates additional information that is converted back for updating the destination index 206, the candidate destination 216, and the candidate segment 212 and for the continued operation of the navigation system 100 and to continue the movement in the physical world.

The first software 326 of FIG. 3 of the first device 102 of FIG. 3 can include the navigation system 100. For example, the first software 326 can include the receiver module 402, the location module 404, the category module 406, the index module 408, the segmentation module 416, and the route generator module 422.

The first control unit 312 of FIG. 3 can execute the first software 326 for the receiver module 402 to receive the entry 202. The first control unit 312 can execute the first software 326 for the location module 404 to identify the geographic location 226. The first control unit 312 can execute the first software 326 for the category module 406 to identify the category of interest 228.

The first control unit 312 can execute the first software 326 for the index module 408 to generate the destination index 206. The first control unit 312 can execute the first software 326 for the segmentation module 416 to generate the entry update 222. The first control unit 312 can execute the first software 326 for the route generator module to generate the route 208. The first control unit 312 of can execute the first display interface 330 of FIG. 3 to display the route 208.

The second software 342 of FIG. 3 of the second device 106 of FIG. 3 can include the navigation system 100. For example, the second software 342 can include the receiver module 402, the location module 404, the category module 406, the index module 408, the segmentation module 416, and the route generator module 422.

The second control unit 334 of FIG. 3 can execute the second software 342 for the receiver module 402 to receive the entry 202. The second control unit 334 can execute the second software 342 for the location module 404 to identify the geographic location 226. The second control unit 334 can execute the second software 342 for the category module 406 to identify the category of interest 228. The second control unit 334 can execute the second software 342 for the index module 408 to generate the destination index 206.

The second control unit 334 can execute the second software 342 for the segmentation module 416 to generate the entry update 222. The second control unit 334 can execute the second software 342 for the route generator module to generate the route 208. The second control unit 334 of can execute the second display interface 340 of FIG. 3 to display the route 208.

The navigation system 100 can be partitioned between the first software 326 and the second software 342. For example, the second software 342 can include the location module 404, the category module 406, the index module 408, the segmentation module 416, and the route generator module 422. The second control unit 334 can execute modules partitioned on the second software 342 as previously described.

The first software 326 can include the receiver module 402. Based on the size of the first storage unit 314, the first software 326 can include additional modules of the navigation system 100. The first control unit 312 can execute the modules partitioned on the first software 326 as previously described.

The first user interface 318 of FIG. 3 can receive the entry 202 by the user, the navigation system 100, or a combination thereof for the receiver module 402. The first control unit 312 can operate the first communication unit 316 to send the entry 202 to the second device 106. The first control unit 312 can operate the first software 326 to operate the location unit 320.

The second communication unit 336 of FIG. 3 can send the route 208 to the first device 102 through the communication path 104 of FIG. 3. The route 208 can be displayed on the first display interface 330 and the second device 106.

It has been discovered that the present invention provides the navigation system 100 to generate the entry update 222 for a safer operation of the vehicle, the navigation system 100, and other user interface system for the navigation system 100. By generating the entry update 222, the accuracy to identify the target destination 210 based on the entry 202 for the point of interest 204 increases. Furthermore, by identifying the correct location of the target destination 210, the navigation system 100 can generate the route 208 to the point of interest 204 desired by the user, the navigation system 100, or a combination thereof. As a result, the accurate information improves the efficiency and productivity, thus, leading to the safer operation of the vehicle and the navigation system 100.

The navigation system 100 describes the module functions or order as an example. The modules can be partitioned differently. For example, the location module 404 and the category module 406 can be combined. Each of the modules can operate individually and independently of the other modules.

Furthermore, data generated in one module can be used by another module without being directly coupled to each other. For example, the segmentation module 416 can receive the entry 202 from the receiver module 402. The receiver module 402, the location module 404, the category module 406, the index module 408, the segmentation module 416 and the route generator module 422 can be implemented in as hardware (not shown) within the first control unit 312, the second control unit 334, or special hardware (not shown) in the first device 102 or the second device 106.

Figure 5:
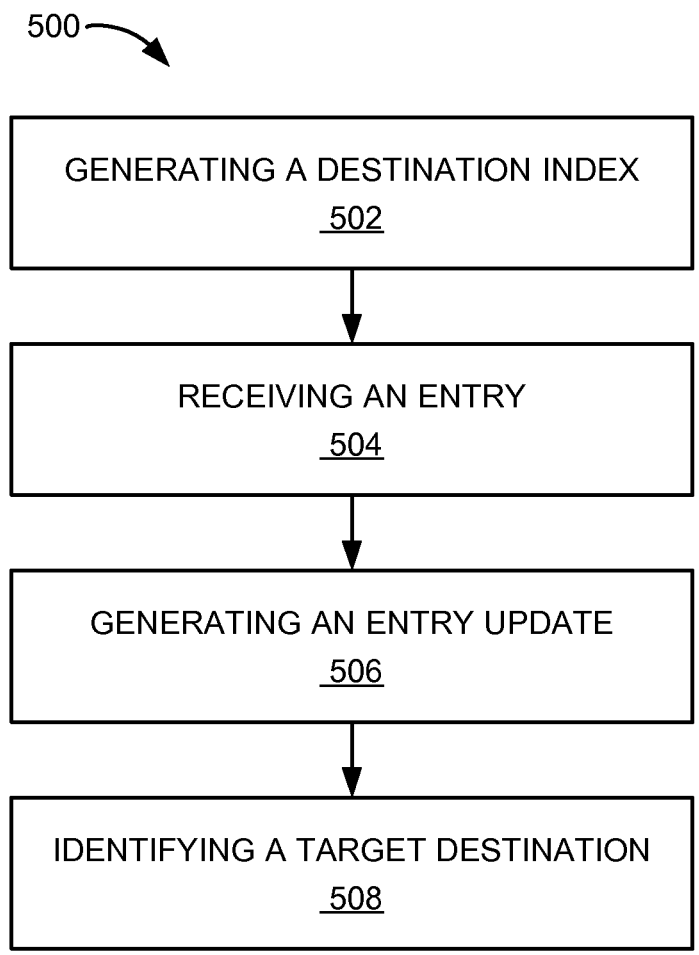
FIG. 5 is a flow chart of a method of operation of the navigation system in a further embodiment of the present invention.

Referring now to FIG. 5, therein is shown a flow chart of a method 500 of operation of the navigation system 100 in a further embodiment of the present invention. The method 500 includes: generating a destination index based on a search indicator for distinguishing a candidate destination from another in a block 502; receiving an entry for a point of interest in a block 504; generating an entry update based on segmenting the entry for comparing the entry update to the destination index in a block 506; and identifying a target destination based on resolving the destination index with the search indicator for matching the entry update to the candidate destination for displaying on a device in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
generating a destination index with a control unit based on a search indicator for distinguishing a candidate destination from another;
receiving an entry for a point of interest;
generating an entry update based on segmenting the entry for comparing the entry update to the destination index; and
identifying a target destination based on resolving the destination index with the search indicator for matching the entry update to the candidate destination for displaying on a device.

2. The method as claimed in claim 1 wherein generating the entry update includes correcting the entry for comparing the entry to the destination index.

3. The method as claimed in claim 1 wherein generating the destination index includes identifying a geographic location for limiting the entry update compared to the candidate destination.

4. The method as claimed in claim 1 wherein generating the destination index includes identifying a category of interest for limiting the entry update compared to the candidate destination.

5. The method as claimed in claim 1 wherein:
generating the destination index includes generating a candidate segment for segmenting the candidate destination; and
generating the entry update includes segmenting the entry for grouping the entry update.

6. A method of operation of a navigation system comprising:
generating a destination index with a control unit based on a search indicator for distinguishing a candidate destination from another;
receiving an entry for a point of interest;
generating an entry update based on segmenting the entry for comparing the entry update to the destination index;
identifying a target destination based on resolving the destination index with the search indicator for matching the entry update to the candidate destination; and
generating a route to the target destination for displaying on a device.

7. The method as claimed in claim 6 wherein generating the destination index includes:
generating a candidate segment for segmenting the candidate destination; and
generating the search indicator for assigning the search indicator to the candidate segment.

8. The method as claimed in claim 6 wherein generating the entry update includes generating an update result for comparing the entry update to the candidate destination.

9. The method as claimed in claim 6 wherein:
generating the destination index includes generating the destination index based on a geographic location for matching the entry update to the candidate destination; and
identifying the target destination includes matching the entry update to the candidate destination based on the geographic location for limiting the candidate destination compared.

10. The method as claimed in claim 6 wherein:
generating the destination index includes generating the destination index based on a category of interest for matching the entry update to the candidate destination; and
identifying the target destination includes matching the entry update to the candidate destination based on the category of interest for limiting the candidate destination compared.

11. A navigation system comprising:
a control unit for:
generating a destination index based on a search indicator for distinguishing a candidate destination from another,
receiving an entry for a point of interest,
generating an entry update based on segmenting the entry for comparing the entry update to the destination index,
identifying a target destination based on resolving the destination index with the search indicator for matching the entry update to the candidate destination, and
a display interface, coupled to the control unit, for displaying a route to the target destination.

12. The system as claimed in claim 11 wherein the control unit is for correcting the entry for comparing the entry to the destination index.

13. The system as claimed in claim 11 wherein the control unit is for identifying a geographic location for limiting the entry update compared to the candidate destination.

14. The system as claimed in claim 11 wherein the control unit is for identifying a category of interest for limiting the entry update compared to the candidate destination.

15. The system as claimed in claim 11 wherein the control unit is for:
generating a candidate segment for segmenting the candidate destination; and
segmenting the entry for grouping the entry update.

16. The system as claimed in claim 11 wherein the control unit is for:
identifying a target destination based on resolving the destination index with the search indicator for matching the entry update to the candidate destination; and
generating a route to the target destination for displaying on the device.

17. The system as claimed in claim 16 wherein the control unit is for:
generating a candidate segment for segmenting the candidate destination; and
generating the search indicator for assigning the search indicator to the candidate segment.

18. The system as claimed in claim 16 wherein the control unit is for generating an update result for comparing the entry update to the candidate destination.

19. The system as claimed in claim 16 wherein the control unit is for:
generating the destination index based on a geographic location for matching the entry update to the candidate destination; and
matching the entry update to the candidate destination based on the geographic location for limiting the candidate destination compared.

20. The system as claimed in claim 16 wherein the control unit is for:
generating the destination index based on a category of interest for matching the entry update to the candidate destination; and matching the entry update to the candidate destination based on the category of interest for limiting the candidate destination compared.

\* \* \* \* \*